United States Patent [19]
Guimont

[11] Patent Number: 5,873,038
[45] Date of Patent: Feb. 16, 1999

[54] SYSTEM AND METHOD FOR DISTRIBUTING CHANNEL PORT LOADING FUNCTIONALITY

[75] Inventor: Vincent Guimont, Blainville, Canada

[73] Assignee: Telefonaktiebolaget LM Ericsson (publ), Stockholm, Sweden

[21] Appl. No.: 601,676

[22] Filed: Feb. 15, 1996

[51] Int. Cl.⁶ .................... H04Q 7/20; H04B 7/00
[52] U.S. Cl. .................. 455/453; 455/511; 455/516
[58] Field of Search ........................ 455/453, 455, 455/450, 509, 511, 512, 524, 516, 422, 561, 446, 513, 445; 370/327, 341

[56] References Cited

U.S. PATENT DOCUMENTS

| | | | |
|---|---|---|---|
| 4,670,899 | 6/1987 | Brody et al. | 455/453 |
| 4,974,256 | 11/1990 | Cyr et al. | 455/453 |
| 5,235,598 | 8/1993 | Sasuta | 455/511 |
| 5,239,678 | 8/1993 | Grube et al. | 455/512 |
| 5,241,685 | 8/1993 | Bodin et al. | 455/453 |
| 5,241,686 | 8/1993 | Charbonnier | 455/453 |
| 5,280,630 | 1/1994 | Wang | 455/453 |
| 5,379,448 | 1/1995 | Ames et al. | 455/524 |
| 5,442,809 | 8/1995 | Diaz et al. | 455/511 |
| 5,625,868 | 4/1997 | Jan et al. | 455/13.4 |
| 5,633,915 | 5/1997 | Yang et al. | 455/453 |
| 5,697,054 | 12/1997 | Andersson | 455/524 |

*Primary Examiner*—Dwayne D. Bost
*Assistant Examiner*—Tracy M. Legree
*Attorney, Agent, or Firm*—Steven W. Smith

[57] ABSTRACT

The present invention describes a system and a method for distributing channel port loading functionality in a radio base station. The radio base station has a plurality of transceivers and at least one frequency agile combiner. The transceivers have a plurality of channel ports each able to transceive either one of at least two channel functions each having corresponding higher or lower loading averages. The method has steps of averaging loading of each channel port over a predetermined period of time, identifying and seizing the channel port having lower average loading, reconfiguring the identified and seized channel port to the channel function having the higher loading average, letting adjust the frequency agile combiner accordingly and transferring the communication having higher loading average on the reconfigured channel port. The system has a module for determining the loading average of each channel port over a predetermined period of time, a module for identifying and seizing the channel port having lower loading average, and a device for reconfiguring the channel ports identified and seized to the channel functions having higher loading average, and for transferring one of the communications having higher loading average to the channel port reconfigured.

23 Claims, 8 Drawing Sheets

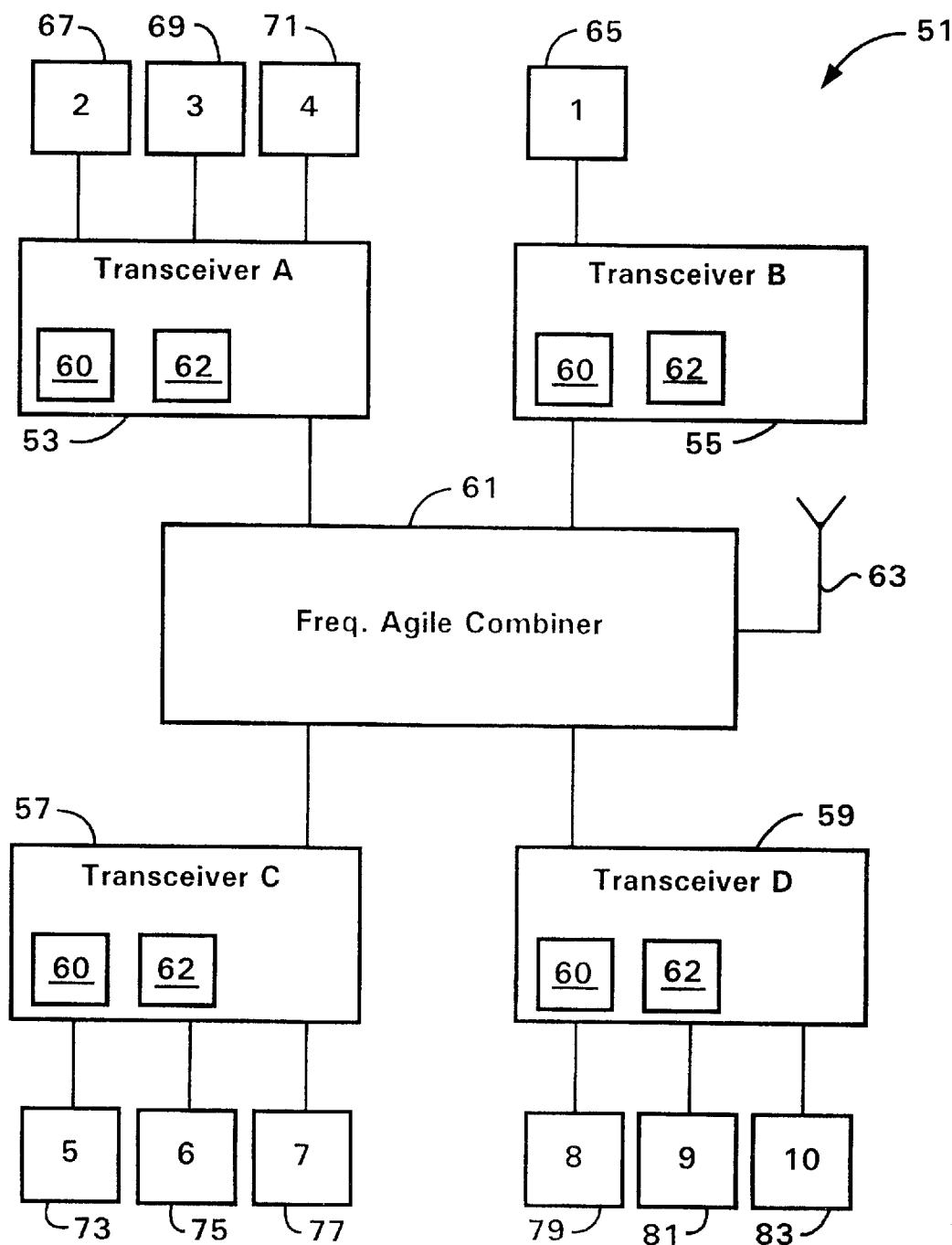

SYSTEM AND METHOD FOR DISTRIBUTING CHANNEL PORT LOADING FUNCTIONALITY

BACKGROUND OF THE INVENTION

1. Field of the Invention

The present invention relates to a system and method for distributing channel port loading functionality in a radio base station of a cellular telecommunications system, and more particularly for distributing channel port loading functionality over a plurality of transceivers in a cellular radio base station.

2. Description of Related Art

Currently, base stations in cellular telecommunications systems include several transceivers. Each of these transceivers has at least one channel port which is capable of transmitting and receiving one of different kinds of communications. Typically, each of these different kinds of communications have different loading averages. These different kinds of communications distributed over the channel ports create an uneven usage of the channel ports. Such a distribution creates an overworking of some of the channel ports with premature failure of the corresponding transceivers, and underworking of the others.

To overcome this problem, it has sometimes been a practice to manually interchange the channel ports and to manually readjust the combiner to which the transceivers are connected. However, this operation requires sending out a technician to the radio base station site, which is not always practical and which is expensive in remote areas. Also, since the operation is performed manually, several minutes are necessary to interchange channel ports and re-adjust the combiner during which time the radio base station has to be shut down. Accordingly, it is not always possible, nor desirable, to stop an essential radio link for a few minutes to effect this change. Further, since a technician is required, the operation cannot be efficiently performed on a regularly scheduled (i.e. daily or weekly) basis.

There are no known prior art teachings of a solution to the aforementioned deficiency and shortcoming. Therefore, it would be a distinct advantage to have a method and a system capable of automatically distributing the channel port loading functionality over a plurality of transceivers, which could be effected with minimal disruption of the operation of the radio base station.

SUMMARY OF THE INVENTION

In accordance with one aspect of the present invention, the typical radio base station includes at least one frequency agile combiner, a plurality of transceivers having a plurality of channel ports, each channel port being able to transceive either one of at least two channel functions. The channel functions each have a corresponding higher or lower average loading. The method comprises a first step of averaging loading of each channel port over a predetermined period of time. Then, the channel ports having average loading below a predetermined value are identified and seized. The next step is to reconfigure the identified and seized channel ports to the channel function having the higher loading average, to let adjust the frequency agile combiner accordingly and to allow transceiving of the communication having higher average loading on the identified and seized channel ports.

In accordance with another aspect of the invention, the present invention is a functionality loading distributing system. The system comprises a plurality of transceivers each having a plurality of channel ports. The channel ports are each able to transceive one of at least two channel functions. Each channel function has a corresponding higher or lower loading averages. Each channel port has a transmitting frequency. The system also comprises means for determining the loading average of each channel port over a predetermined period of time and means for identifying and seizing the channel port having lower loading average. The system further comprises means for reconfiguring the channel port identified and seized to the channel function having higher loading average, and for transferring one of the communications having higher loading average to the channel port reconfigured. Also, the system comprises at least one frequency agile combiner connected to the transceivers and to the means for reconfiguring. The at least one frequency agile combiner has means for modifying its reconfiguration according to the transmitting frequency and the channel function of each channel port

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2A is a simplified block diagram of a cellular radio base station having a functionality loading distributing system according to the present invention;

DETAILED DESCRIPTION OF EMBODIMENTS

Figure 1:
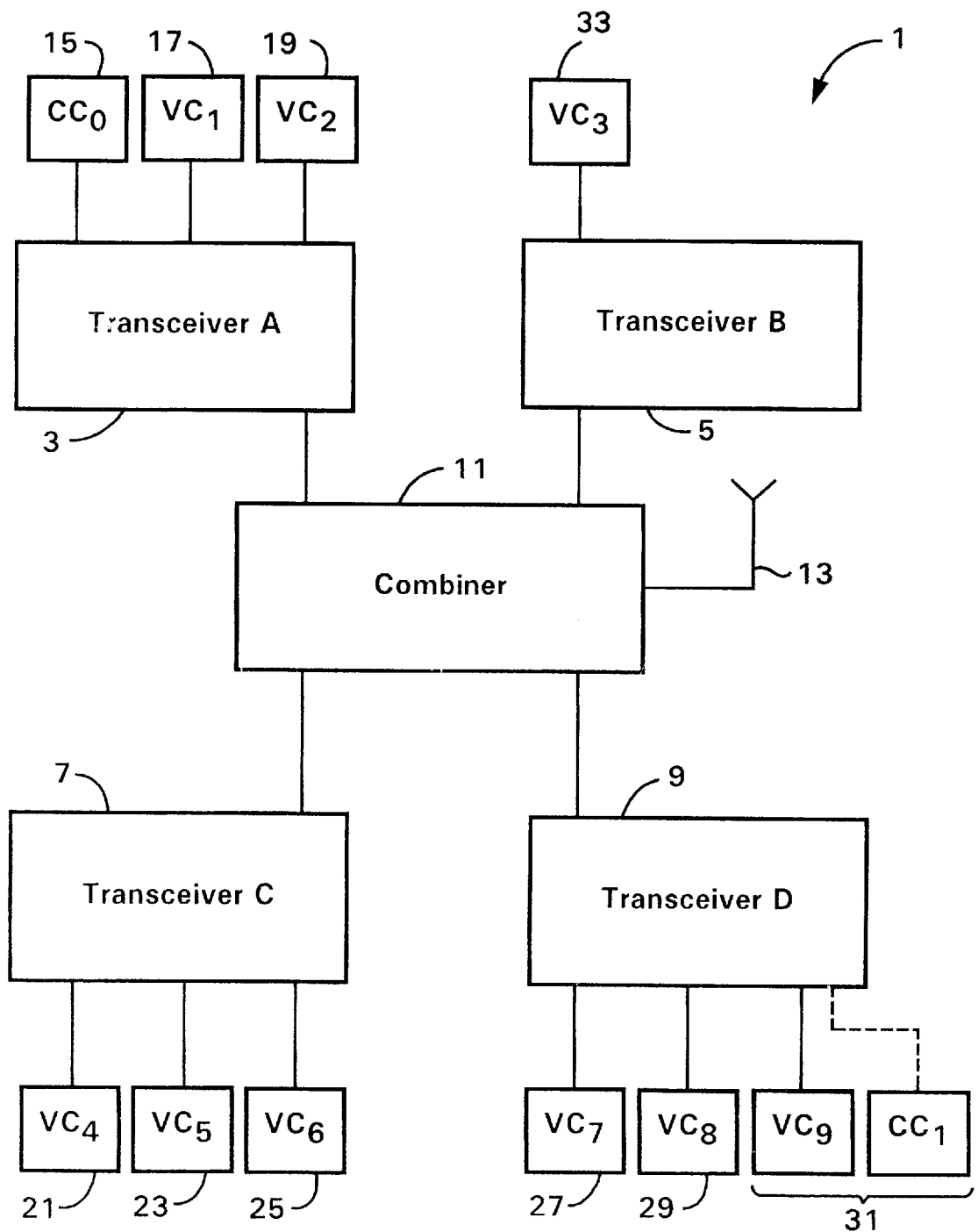
FIG. 1 (prior art) is a simplified block diagram of an existing cellular radio base station.

Referring to FIG. 1, there is illustrated a block diagram of a conventional cellular radio base station 1, which will be used to describe the radio base stations known in the prior art. This exemplary cellular radio base station 1 has four transceivers (transceivers A, B, C and D, respectively 3, 5, 7 and 9). The radio base station 1 also has a combiner 11 and an antenna 13. Of course, it is understood to those skilled in the art that other numbers of transceivers, combiners 11 and antennas 13 could have been used for this example. Transceiver A 3 as well as transceivers C 7 and D 9, represent digital transceivers, which in a typical base station designed by, for example Ericsson Communications Inc., have three channel ports per transceiver. Transceiver A 3 has a channel port 15 having a channel function of digital control channel, and has two channel ports 17 and 19 performing the channel function of digital voice channels. Transceiver C 7 has three channels, 21, 23 and 25 which perform as digital voice channels. Transceiver D 9 also has channel ports 27, 29 and 31 which perform as digital voice channels. Channel port 31 also performs the channel function of backup control channel CC1. The transceiver B 5 is an analog transceiver. According to Ericsson's design, analog transceivers have one channel port 33, which in this case performs the analog voice channel function.

In such cellular radio base stations, there is one digital control channel $CC_0$, in this case channel port 15 of transceiver A 3, and one backup digital control channel $CC_1$, channel port 31 of transceiver D 9. The channel port 15 having the control channel $CC_0$ function is used continuously to send information to and receive information from mobile subscribers (not shown). The channel port 31 having the backup control channel $CC_1$ function replaces the channel port 15 carrying control channel $CC_0$ only in case of failure. Thus, the channel port 15 with the channel function of control channel $CC_0$ has a high loading. All of the channel ports which perform the voice channel function ($VC_1$ to $VC_9$) are used on an "as per request" basis. Therefore, the channel ports with voice channel functions are used less often than the channel port 15 with the control channel $CC_0$ function which transceives continuously. Hence, the transceiver A 3, which has one of its channel ports dedicated to the control channel, has an average loading greater than the other transceivers. Transceiver A 3 consequently has a higher rate of failure due to overusage, than the other transceivers in radio base station 1.

Referring now to FIG. 2A, there is shown a simplified block diagram of a radio base station having a functionality loading distributing system 51 according to the present invention. For exemplary purposes only, the functionality distributing system shown corresponds to that of a cellular radio base station, but any other type of radio base station is encompassed. The system 51 shown has four transceivers 53, 55, 57 and 59, but it should be clearly understood that other numbers of transceivers could be used. Each of these transceivers has at least one channel port which has a known frequency. Each channel port is capable of transceiving one of at least two channel functions. In this particular embodiment, the two channel functions are voice and control channels. Of course, channel functions such as analog voice channel, digital voice channel, extended digital voice channel, analog control channel and digital control channel are encompassed by the present invention. As known in cellular networks, these two channel functions have different loading averages. The control channel function has a high loading average due to its continual usage. On the other hand, the voice channel function always has a lower loading average due to its intermittent transmission over the voice channel.

In FIG. 2A, transceivers A, C and D, respectively 53, 57 and 59 are digital transceivers, each having three channel ports. Transceiver A has ports 67, 69 and 71; transceiver C has ports 73, 75 and 77; and transceiver D has ports 79, 81 and 83. Transceiver B 55 is an analog transceiver having only one channel port 65. Of course, it is clear to those skilled in the art that each transceiver could have more or less than the number of channel ports indicated without departing from the scope of the present invention.

The system 51 also has a determining circuit 60 within each transceiver (see FIG. 2B) for determining the loading average of each channel port over a predetermined period of time. That predetermined period of time may selectively comprise periods of 24 hours, of weeks, of months, or the life span of the transceivers 53, 55, 57 and 59. Preferably, the determining circuit 60 is a processing and memory device in each transceiver which computes the average usage of each channel port. Alternatively, it could also be a centralized sampler in a mobile switching center (not shown), or any similar device.

The four transceivers, 53, 55, 57 and 59 are combined through a frequency agile combiner 61 which generates an output signal transmitted through an antenna 63. Of course, more than one frequency agile combiner 61 could be used. The frequency agile combiner 61 is a known component. The frequency agile combiner 61 is preferred since it can automatically reconfigures itself according to the transmitting frequency of each channel port. Of course, any other similar device could also be used (e.g. hybrid combiner).

Figure 2B:
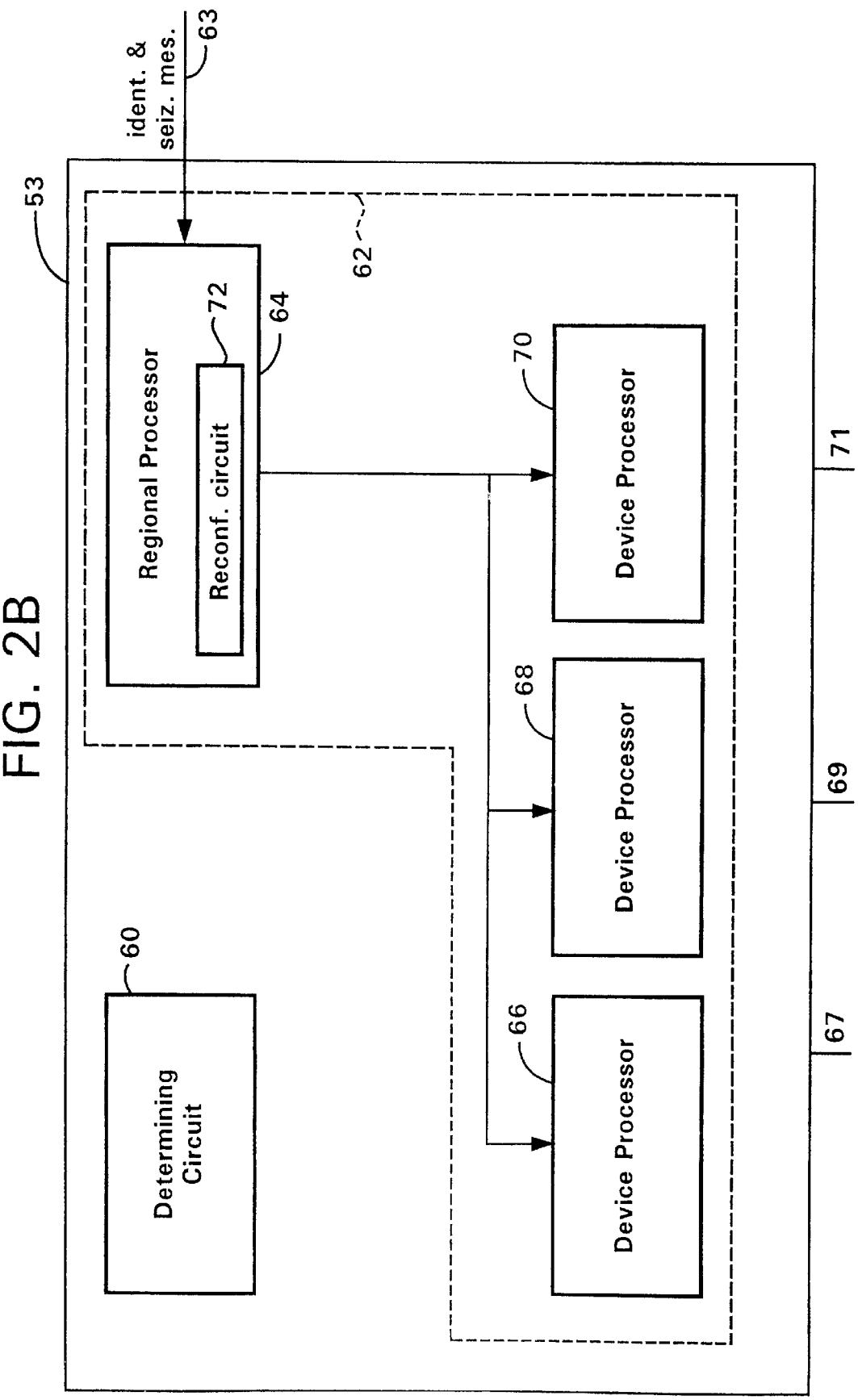
FIG. 2B is a simplified block diagram of one of the transceivers of FIG. 2A.

FIG. 2B shows with more detail the components of one of the transceivers 53, 55, 57 and 59. To allow changing of the channel functions, an identifying and seizing circuit 62 is used. Preferably, the channel port having the lowest average loading is seized by the identifying and seizing circuit 62. The identifying and seizing circuit 62 may perform the following steps: 1) receives from a Mobile Switching Center (not shown) an identifying and seizing message 63; 2) sends the message to a Device Processor corresponding to the channel port with the lowest average loading; and 3) disables the seized channel port. More precisely, the identifying and seizing circuit 62 includes a Regional Processor 64 which receives the identifying and seizing message, and one Device Processor 66, 68 and 70 per channel port 67, 69 and 71. Upon receipt of the identifying and seizing message 63 by the Regional Processor 64, the Regional Processor communicates the message to the corresponding Device Processor, for example Device Processor 70. Device Processor 70 receives the message and disables its corresponding channel port. Preferably, the identifying and seizing circuit 62 is provided with a system for ensuring avoidance of service interruption by verifying if the channel ports are transceiving and if they are transceiving, making sure no transfer is performed on the transceiving channel ports.

The system further has a reconfiguring circuit 72 for reconfiguring the seized channel port to the new channel function for which it will be used. The reconfiguring circuit preferably comprises a program stored and run in the Regional Processor 64 corresponding to the identified and seized channel port. The program reconfigures the identified and seized channel port to a new type of transmission.

Of course, as indicated previously, any other configuration having at least two different types of channel port loading could have been used, but the cellular radio base station configuration has been chosen for exemplary purposes only.

Figure 3:
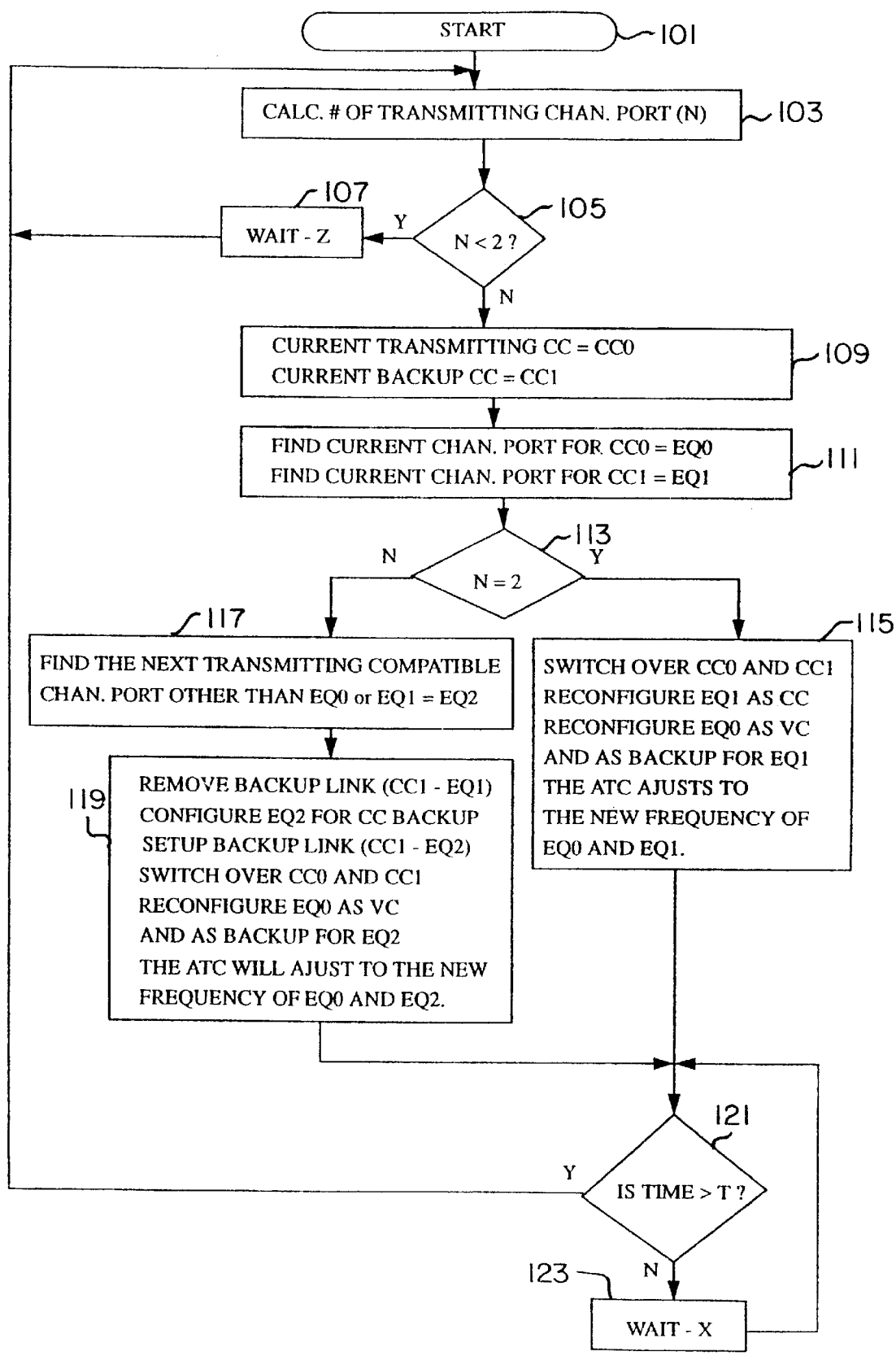
FIG. 3 is a flow chart illustrating the method of the present invention according to a first embodiment.

Referring now to FIG. 3, there is shown a first embodiment of the method of the present invention. This method involves distributing channel port functionality for two channel functions over transceivers having at least one channel port each. The two channel functions used in this example are the control channel and the voice channel. The transceivers referred to herein are analog transceivers. Of course, any other channel functions or transceivers could also be used without departing from the scope of the present invention.

The method starts at step 101 and then moves to step 103 where the number of channel ports (N) is calculated 103. The method then moves to step 105 where it is determined whether or not the number of channel ports is less than 2. If the number of channel port is less than 2 a delay of Z is started at 107 which results in not distributing the channel port loading functionality because there is only one channel port. Otherwise, if the number of channel ports is greater than or equal to 2, the method moves to step 109 where the current transmitting control channel is labelled CC0 while the current backup control channel is labelled CC1. Then, in step 111, the channel port linked to the current transmitting control channel CC0 is labelled EQ0, while the channel port linked to the backup control channel CC1 is labelled EQ1.

At step 113 it is determined whether or not the number of channel ports equals 2. If the number of channel port (N) is equal to 2, the method moves to step 115 where the following steps are performed: the transmitting control channel CC0 is switched to the backup control channel CC1; EQ1 is reconfigured as a control channel; EQ0 is reconfigured as a voice channel and as a backup for EQ1; and the frequency agile combiner (ATC) adjusts to the new frequencies of EQ0 and EQ1. However, if it is determined at 113 that the number of channel ports is greater than 2, the method moves to step 117 where the next compatible channel port other than EQ0 and EQ1 is labelled EQ2. Then, at 119, the following steps are performed:

remove the backup link between the control channel CC1 and EQ1;

configure EQ2 for a control channel backup; set up a backup link between control channel CC1 and EQ2;

switch over the transmitting control channel CC0 to backup control channel CC1;

reconfigure the EQ0 as a voice channel and as a backup for EQ2; and let adjust the frequency agile combiner (ATC) to the new frequencies of EQ0 and EQ2.

Following the completion of steps 115 or 119, the method moves to step 121 where it is determined whether or not a time T has elapsed since the completion of step 115 or 119. If not, the method moves to 123 and waits an incremented time X. This process continues until time T has elapsed. The method then returns to step 103.

Figure 4A:
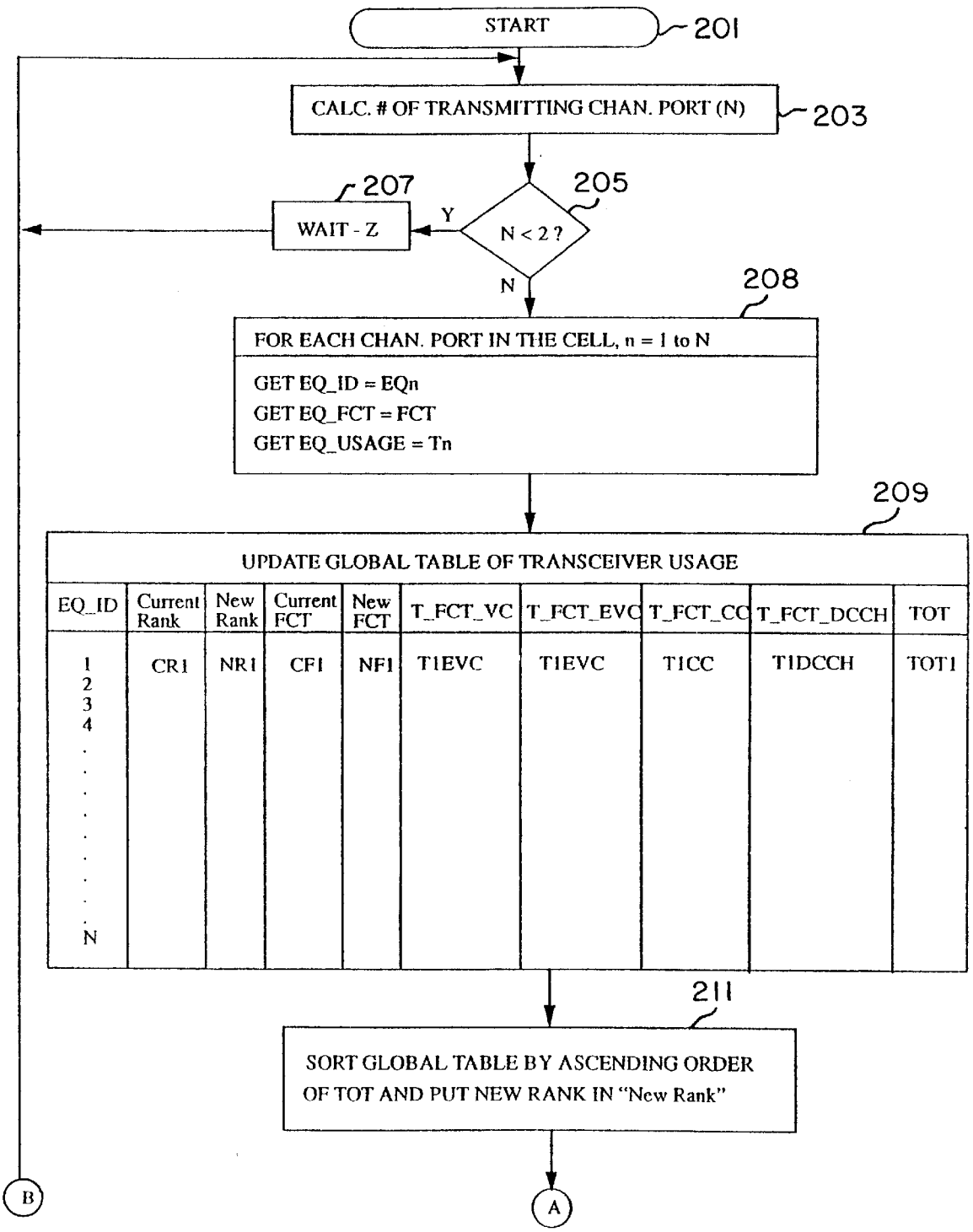
FIGS. 4A–4D are a flow chart illustrating the method of the present invention according to a second embodiment.

Referring now to FIG. 4A, there is shown a second embodiment of the method of the present invention. The method shown is for distributing loading functionality for at least two channel functions over a plurality of channel ports. More precisely, the channel functions used in this example are: voice channel, extended voice channel, control channel and digital control channel. The digital control channel DCCH and the control channel CC have the highest functionality loading. They are followed by the extended voice channels EVC. The voice channels VC have the lowest functionality loading in this example. Of course, these channel functions are used for exemplary purposes only, and other channel functions could be used as well.

The method begins at step 201 and then moves to step 203 where the number of channel ports (N) is calculated. The method then moves to step 205 where it is determined whether or not the number of channel ports (N) is less than 2. If the number of channel ports (N) is less than 2, a delay of Z is started at step 207 which results in not distributing the channel port loading functionality because there is only one channel port and the method goes back to step 203. If however, the number of channel ports (N) is greater than or equal to 2, the method moves to step 207 where the following steps are performed:

for each channel port in the base station, get the EQ_ID equal to $EQ_N$ which is the actual Channel port number;

get the EQ_FCT equal to FCT which represents the actual function that the channel port is performing;

get EQ_USAGE equal to $T_N$ which represents the loading of the channel port since the last retrieval.

At next step 209, the method updates the global table of transceiver usage with the values collected in step 207. This table describes different parameters for each channel port. These parameters are the following:

EQ_ID: which represents the channel port identification number;

Current Rank: which ranks the channel ports by order of average loading as per the last functionality distribution;

New Rank: which indicates the new rank of each channel port by order of average loading as per the next distribution;

Current FCT: keeps track of the function (i.e. channel function) of each channel port;

New FCT: the function that should be reconfigured to that channel port upon the next distribution;

T_FCT_VC: the total time that channel port was used as a voice channel;

T_FCT_EVC: the total time that channel port was used as an extended voice channel;

T_FCT_CC: the total time that channel port was used as an analog control channel;

T_FCT_DCCH: the total time that channel port was used as a digital control channel; and TOT: which indicates the total loading functionality of each channel port. TOT is calculated by adding the different total times indicated above with their average loading value (which is a known value). From this updated table, the method moves to step 211 and sorts that table by ascending order of totals, and updates the new rank for each channel port.

Figure 4B:
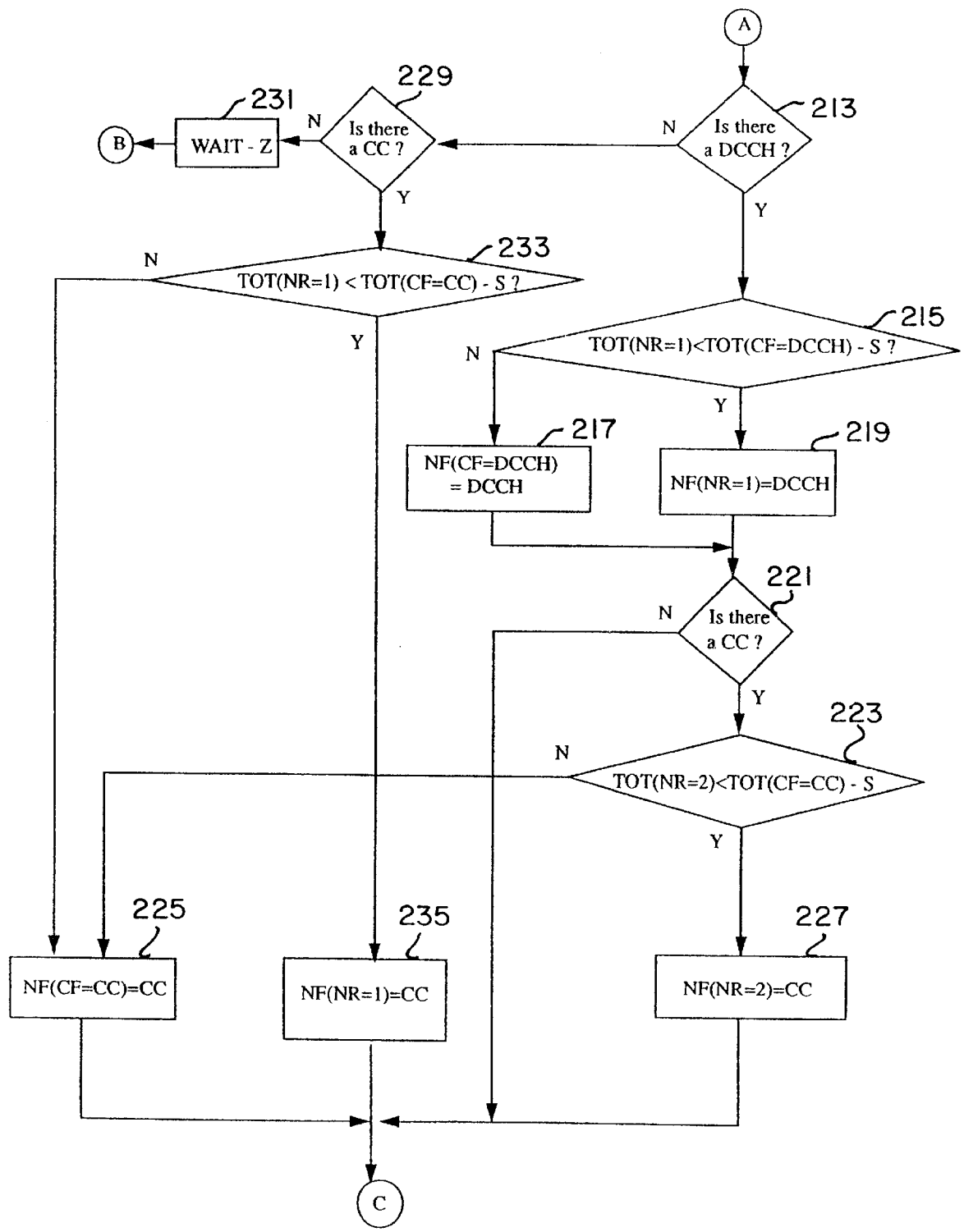

The method then moves to FIG. 4B, step 213 where it is determined whether or not there is a digital control channel. If there is no digital control channel, the method moves to step 229. However, if there is a digital control channel, the method moves to step 215 where a computation is performed to determine whether it is worth changing the digital control channel. This computation is performed by determining whether or not the total value for the new rank No. 1 (i.e. the least used channel port) is less than the total value of the actual digital control channel from which a predetermined buffer value (S) is subtracted. If not, the method moves to step 217 where the digital control channel stays the same. However, if the total value is less, the method moves to step 219 where the new function of the channel port for which the new rank equals 1 (NR=1) becomes digital control channel (DCCH). Hende, the least used channel port will be used as digital control channel (DCCH)

At step 221, it is determined whether or not there is an analog control channel (CC). If there is no analog control channel, the method moves to FIG. 4C, step 239. Otherwise, if there is an analog control channel, the method moves to step 223 where it is determined whether the total usage of the new rank No. 2 is less than the total usage of the actual analog control channel from which is subtracted a buffer (S). If not, the method moves to step 225 where the actual control channel stays the same. Otherwise, the method moves to step 227 where the function of the channel port for which the new rank equals to 2 (NR=2) becomes the analog control channel (CC). From 225 or 227, the next step is step 239, in FIG. 4C.

Referring back to the verification of the presence of a digital control channel in step 213, if there is no digital control channel, the method moves to step 229 where it is determined whether or not there is an analog control channel (CC). If there is no analog control channel, a delay (Z) is activated at 231, and it is followed by returning to the calculation of the number of channel ports in step 203 (FIG. 4A). If however, there is an analog control channel, the method moves to step 233 where it is determined whether or not the total usage of the new rank equal to 1 (NR=1) is less than the total usage of the actual analog control channel from which is subtracted a buffer (S). If not, the method moves to step 225 where the actual control channel stays the same. However, if the total usage of the new rank equalling 1 is less than the total usage of the actual analog control channel less the buffer (S), the method moves to step 235 where the channel function of the channel port having its new rank equal to 1 becomes the new control channel. The method then moves to step 235 step 239 of FIG. 4C.

Figure 4C:
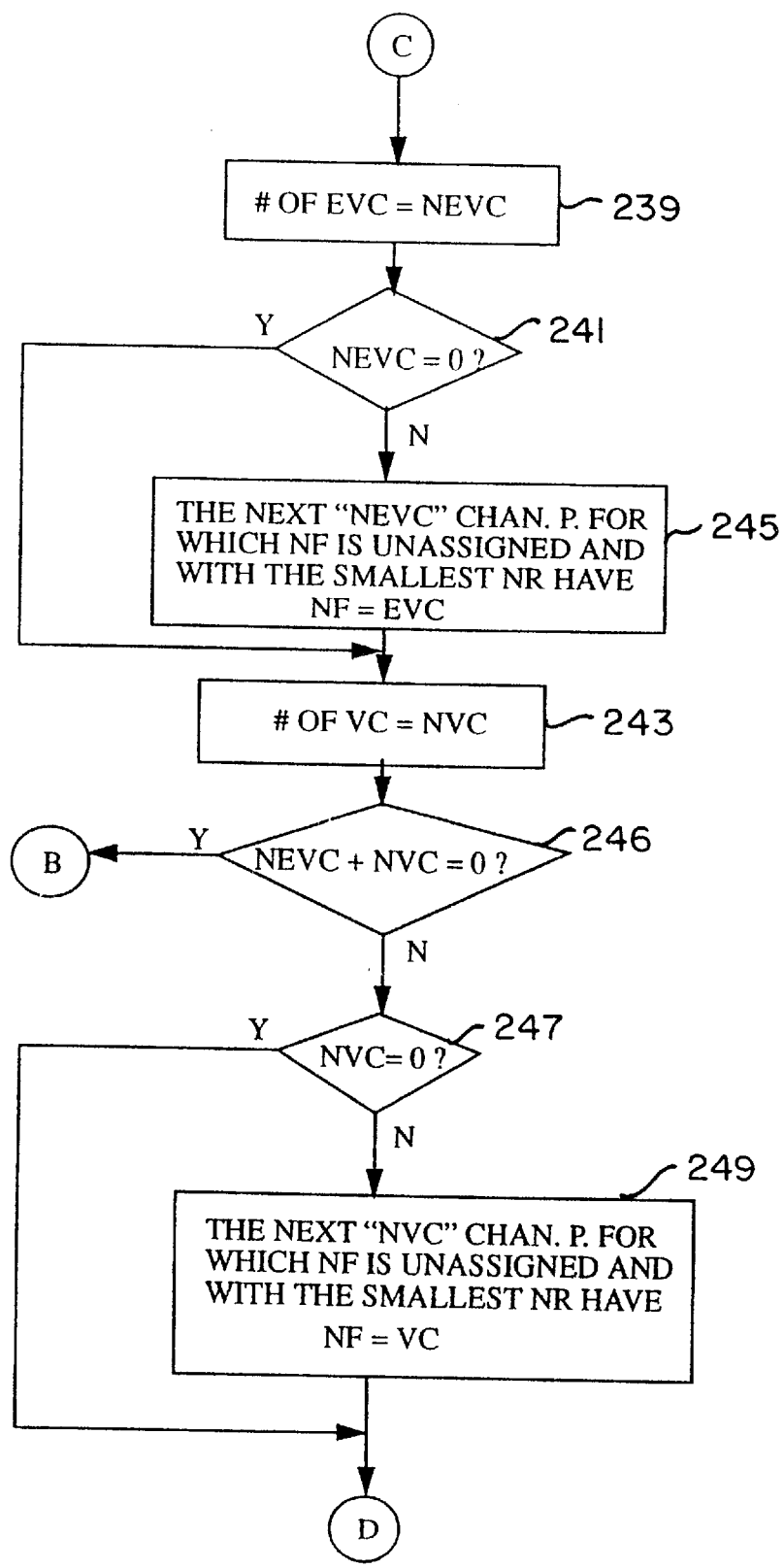

Referring now to FIG. 4C, at step 239, a variable NEVC is set to a value equal to the number of extended voice channels. In step 241, it is determined whether or not the number of extended voice channels NEVC is equal to zero (0). If the NEVC equals 0, the method moves to step 243. Otherwise, the method moves to step 245 in which the next NEVC channel port for which a new function has not been assigned, and which has the smallest new rank, is given a new function equal to an extended voice channel. Then, in step 243, a variable NVC is set to the number of voice channels. Then, in step 246 it is determined whether or not the sum of the number of extended voice channels (NEVC) and the number of voice channels (NVC) is equal to zero (0). If the result equals 0, the method returns to step 203 (FIG. 4A). Otherwise, the method moves to step 247 where it is determined whether or not the number of voice channels (NVC) is equal to 0. If there is no voice channel, the next step performed is step 251 in FIG. 4D. If, on the other hand, the number of voice channels does not equal 0, the method moves to step 249 where the next number of channel port for which the new function is unassigned, and which has the smallest new rank, becomes the new voice channel. The method then moves to FIG. 4D.

Figure 4D:
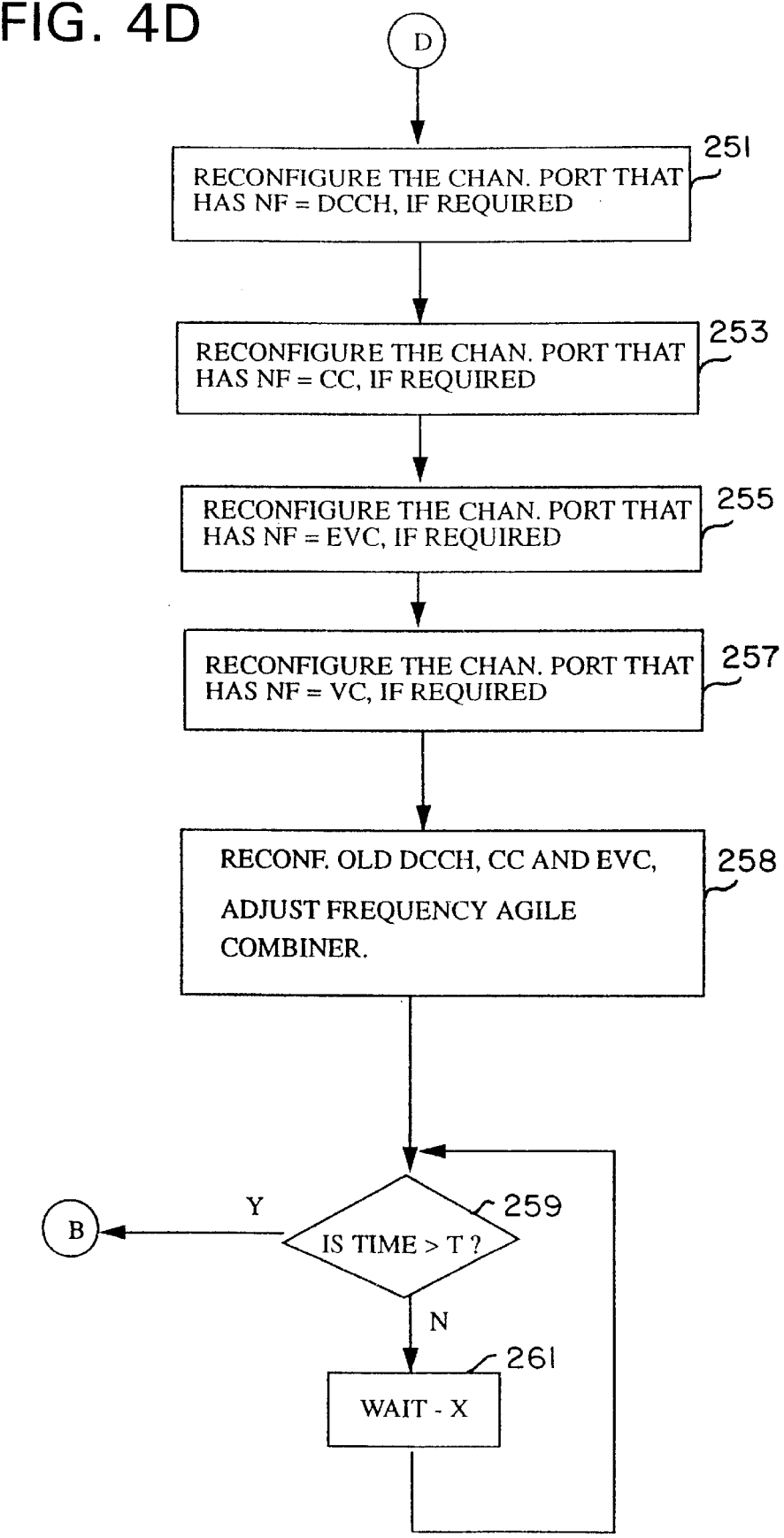

Then, as shown in FIG. 4D, in steps 251, 253, 255 and 257, the channel port having a new function equal to the digital control channel, the analog control channel, the extended voice channel and the voice channel are reconfigured, if required. Afterwards, in step 258, the old digital control channel DCCH, the old analog control channel CC and the old extended voice channels EVC are seized and reconfigured to voice channels, and the frequency agile combiner (ATC) adjusts accordingly if necessary. Then, a time T is started. At step 259, it is determined whether or not time (T) has expired. If time T has expired, the function goes back to step 203. Otherwise, an incremental delay of X is applied in step 261 and the method returns to step 259 until time (T) expires.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

I claim:

1. A method of distributing channel port loading functionality over a plurality of transceivers in a radio base station, the radio base station including at least one frequency agile combiner, the transceivers having a plurality of channel ports each able to transceive one of at least two channel functions, said channel functions including a first channel function having a higher loading average and a second channel function having a lower loading average, the method comprising the steps of:

averaging loading of each channel port over a predetermined period of time;

identifying and seizing a channel port having a lower loading average;

reconfiguring the identified and seized channel port to transceive the first channel function having the higher loading average;

allowing the frequency agile combiner to adjust accordingly; and transferring the first channel function having the higher loading average to the reconfigured channel port, whereby channel port loading functionality is distributed over the plurality of transceivers.

2. The method of distributing channel port loading functionality of claim 1, wherein the step of identifying and seizing a channel port further includes determining whether the channel port having the lower loading average is transceiving, and if it is transceiving, transferring the transceived channel function to another channel port having the same channel function and which is not transceiving.

3. The method of distributing channel port loading functionality of claim 1, wherein the predetermined period of time of the averaging step is 24 hours.

4. The method of distributing channel port loading functionality of claim 1, wherein:

a plurality of channel ports transceive the first channel function having higher loading average;

the step of identifying and seizing identifies and seizes a number of channel ports having lower average loading, the number of identified and seized channel ports equalling the plurality of channel ports transceiving the first channel function having higher average loading;

the step of reconfiguring reconfigures the identified and seized channel ports to transceive the first channel function having the higher loading average;

and the method further comprises allowing transceiving on the reconfigured channel ports.

5. The method of distributing channel port loading functionality of claim 1, wherein the averaging step, the identifying step, the reconfiguring step, the allowing to adjust step and the transferring step are performed every 24 hours.

6. The method of distributing channel port loading functionality of claim 5, wherein the identifying step, the reconfiguring step; the allowing to adjust step, and the transferring step are performed a number of times equal to a quantity of channel ports transceiving the first channel function having the higher average loading.

7. The method of distributing channel port loading functionality of claim 1, wherein after the transfer of the first channel function having the higher average loading to the reconfigured channel port, the method further comprises the steps of:

reconfiguring the channel port freed by that transfer to the second channel function having lower average loading;

allowing the frequency agile combiner to adjust accordingly; and allowing transceiving on the freed channel port.

8. A method of distributing channel port loading functionality over a plurality of transceivers in a cellular radio base station, the radio base station including at least one frequency agile combiner, the transceivers having a plurality of channel ports, one of the channel ports being an actual control channel and the other channel ports being voice channels, the method comprising steps of:

averaging loading of each channel port over a predetermined period of time;

identifying and seizing a voice channel having a loading average below a predetermined value;

reconfiguring the identified and seized voice channel as a new control channel;

allowing the frequency agile combiner to adjust accordingly; and reconfiguring the actual control channel into a voice channel.

9. The method of distributing channel port loading functionality of claim 8, wherein the identifying and seizing of the voice channel includes determining whether the voice channel having the loading average below the predetermined value is transceiving a communication, and if it is transceiving, transferring the communication to another voice channel configured for the same channel function not transceiving.

10. The method of distributing channel port loading functionality of claim 8, wherein the predetermined period of time of the averaging step is 24 hours.

11. The method of distributing channel port loading functionality of claim 8, wherein the averaging step, the identifying step, the step of reconfiguring the voice channel, the allowing to adjust step and the step of reconfiguring the actual control channel are performed every 24 hours.

12. A functionality loading distributing system for a radio base station, said system comprising:

a plurality of transceivers, the transceivers having a plurality of channel ports each able to transceive one of at least two channel functions, said channel functions including a first channel function having a higher loading average and a second channel function having a lower loading average, each channel port having a transmitting frequency;

means for determining the loading average of each channel port over a predetermined period of time;

means for identifying and seizing a channel port having a lower loading average;

means for reconfiguring the identified and seized channel port to transceive the first channel function having higher loading average and for changing its transmitting frequency accordingly, and for transferring the first channel function having higher loading average to the reconfigured channel port; and at least one frequency agile combiner connected to the transceivers and to the means for reconfiguring, the frequency agile combiner having means for modifying its reconfiguration according to the transmitting frequency and the channel function of each channel port;

whereby, the functionality loading is distributed in the radio base station.

13. A functionality loading distributing system for a radio base station, said system comprising:

a plurality of transceivers, the transceivers having a plurality of channel ports each able to transceive one of at least two channel functions having either higher or lower loading averages, each channel port having a transmitting frequency;

means for determining the loading average of each channel port over a predetermined period of time;

means for identifying and seizing the channel port having lower loading average, said means for identifying and seizing comprising means for avoiding service interruption by verifying if the channel port having lower loading average is transceiving and if it is transceiving, transferring the communication to another channel port configured for the same channel function as the transceiving channel and which is not transceiving;

means for reconfiguring the channel port identified and seized to the channel function having higher loading average and for changing its transmitting frequency accordingly, and for transferring one of the communications having higher loading average to the channel port reconfigured; and at least one frequency agile combiner connected to the transceivers and to the means for reconfiguring, the at least one frequency agile combiner having means for modifying its reconfiguration according to the transmitting frequency and the channel function of each channel port;

whereby, the functionality loading can be distributed in the radio base station.

14. The functionality loading distributing system of claim 13, wherein the predetermined period of time of the means for determining is 24 hours.

15. The functionality loading distributing system of claim 12, further comprising means for identifying a channel port transceiving the first channel function having higher loading average, and the means for transferring includes means for transferring the first channel function to the identified channel port.

16. A functionality loading distributing system for a cellular radio base station, said system comprising:

a plurality of transceivers, the transceivers having a plurality of channel ports, one of the channel ports being an actual control channel and the other channel ports being voice channels, each channel port having a transmitting frequency;

means for determining the loading average of each channel port over a predetermined period of time;

means for identifying and seizing a voice channel having a lower loading average;

means for reconfiguring the identified and seized voice channel as a new control channel and for changing its transmitting frequency accordingly;

means for reconfiguring the actual control channel as a new voice channel; and at least one frequency agile combiner connected to the transceivers, the frequency agile combiner having means for modifying its configuration to account for the new control channel and the new voice channel, whereby, the functionality loading is distributed within the base station.

17. The functionality loading distributing system of claim 16, wherein the means for identifying and seizing further comprises means for avoiding service interruption by determining whether the voice channel having lower loading average is transceiving a communication, and if it is transceiving, transferring the communication to a voice channel which is not transceiving.

18. The functionality loading distributing system of claim 16, wherein the predetermined period of time of the means for determining is 24 hours.

19. The functionality loading distributing system of claim 16, wherein the voice channels are analog voice channels.

20. The functionality loading distributing system of claim 16, wherein the voice channels are digital voice channels.

21. The functionality loading distributing system of claim 16, wherein the voice channels are analog and digital voice channels.

22. A method of distributing channel port loading functionality over a plurality of transceivers in a radio base station, the radio base station including at least one frequency agile combiner, the transceivers having a plurality of channel ports each able to transceive one of at least two channel functions which vary in their loading averages, the method comprising the steps of:

identifying a transceiver having a first channel port transceiving the channel function having a highest loading average;

identifying a next transceiver;

identifying and seizing a second channel port, said second channel port being in the next transceiver and transceiving a second channel function;

reconfiguring the identified and seized channel port to transceive the channel function having the highest loading average;

allowing the frequency agile combiner to adjust accordingly; and transferring the channel function having the highest loading average to the reconfigured channel port, whereby channel port loading functionality is distributed over the plurality of transceivers.

23. The method of claim 22, further comprising reconfiguring the first channel port to transceive the second channel function.

* * * * *